US010823985B2

(12) United States Patent
Ferguson

(10) Patent No.: US 10,823,985 B2
(45) Date of Patent: Nov. 3, 2020

(54) SECURITY SWITCH

(71) Applicant: LUNA INNOVATIONS INCORPORATED, Roanoke, VA (US)

(72) Inventor: Stephen K. Ferguson, Atlanta, GA (US)

(73) Assignee: LUNA INNOVATIONS INCORPORATED, Roanoke, VA (US)

( * ) Notice: Subject to any disclaimer, the term of this patent is extended or adjusted under 35 U.S.C. 154(b) by 0 days.

(21) Appl. No.: 16/401,337

(22) Filed: May 2, 2019

(65) Prior Publication Data

US 2019/0258092 A1 Aug. 22, 2019

Related U.S. Application Data

(63) Continuation of application No. 16/107,749, filed on Aug. 21, 2018, now Pat. No. 10,324,316.

(60) Provisional application No. 62/548,035, filed on Aug. 21, 2017.

(51) Int. Cl.
*G02F 1/01* (2006.01)
*G08B 13/08* (2006.01)

(52) U.S. Cl.
CPC .......... *G02F 1/0134* (2013.01); *G08B 13/08* (2013.01); *G02F 2201/307* (2013.01); *G02F 2203/05* (2013.01)

(58) Field of Classification Search
CPC ......... G02F 2201/346; G02F 2201/305; G02F 2201/307; G02F 2203/05; G02F 1/0136; G02F 1/0134
See application file for complete search history.

(56) References Cited

U.S. PATENT DOCUMENTS

| 3,713,049 | A | * | 1/1973 | Desormiere | H03H 9/30 333/102 |
| 5,812,711 | A | * | 9/1998 | Glass | G02B 6/022 385/37 |
| 6,058,226 | A | * | 5/2000 | Starodubov | G02B 6/02195 250/227.11 |
| 6,275,624 | B1 | * | 8/2001 | Seddon | G02B 6/3582 359/224.1 |

(Continued)

OTHER PUBLICATIONS

Non-Final Rejection received for U.S. Appl. No. 16/107,749, dated Jan. 11, 2019, 8 pages.

(Continued)

*Primary Examiner* — Thomas A Hollweg
*Assistant Examiner* — Mary A El-Shammaa
(74) *Attorney, Agent, or Firm* — Kaplan Breyer Schwarz, LLP

(57) ABSTRACT

The present disclosure relates to optical switching devices and switch modules that are designed for long-term security monitoring of high-value infrastructure access entry points. Embodiments in accordance with the present disclosure include optical switches based on fiber-Bragg gratings whose operating wavelengths are based on the presence or absence of magnetic coupling between an embedded permanent magnet and an external element. By monitoring the spectral position of the operating wavelengths and/or the magnitude of a light signal at the operating wavelengths, the state of the magnetic coupling can be determined and used as an indicator of whether the security switch has been actuated.

20 Claims, 6 Drawing Sheets

(56) References Cited

U.S. PATENT DOCUMENTS

2006/0119916 A1* 6/2006 Sutherland .......... G02F 1/13342
359/34
2013/0330032 A1* 12/2013 McNeilly ............. G02B 6/3564
385/13

OTHER PUBLICATIONS

Notice of Allowance and Fees Due (PTOL-85) received for U.S. Appl. No. 16/107,749, dated Mar. 27, 2019, 9 pages.

* cited by examiner

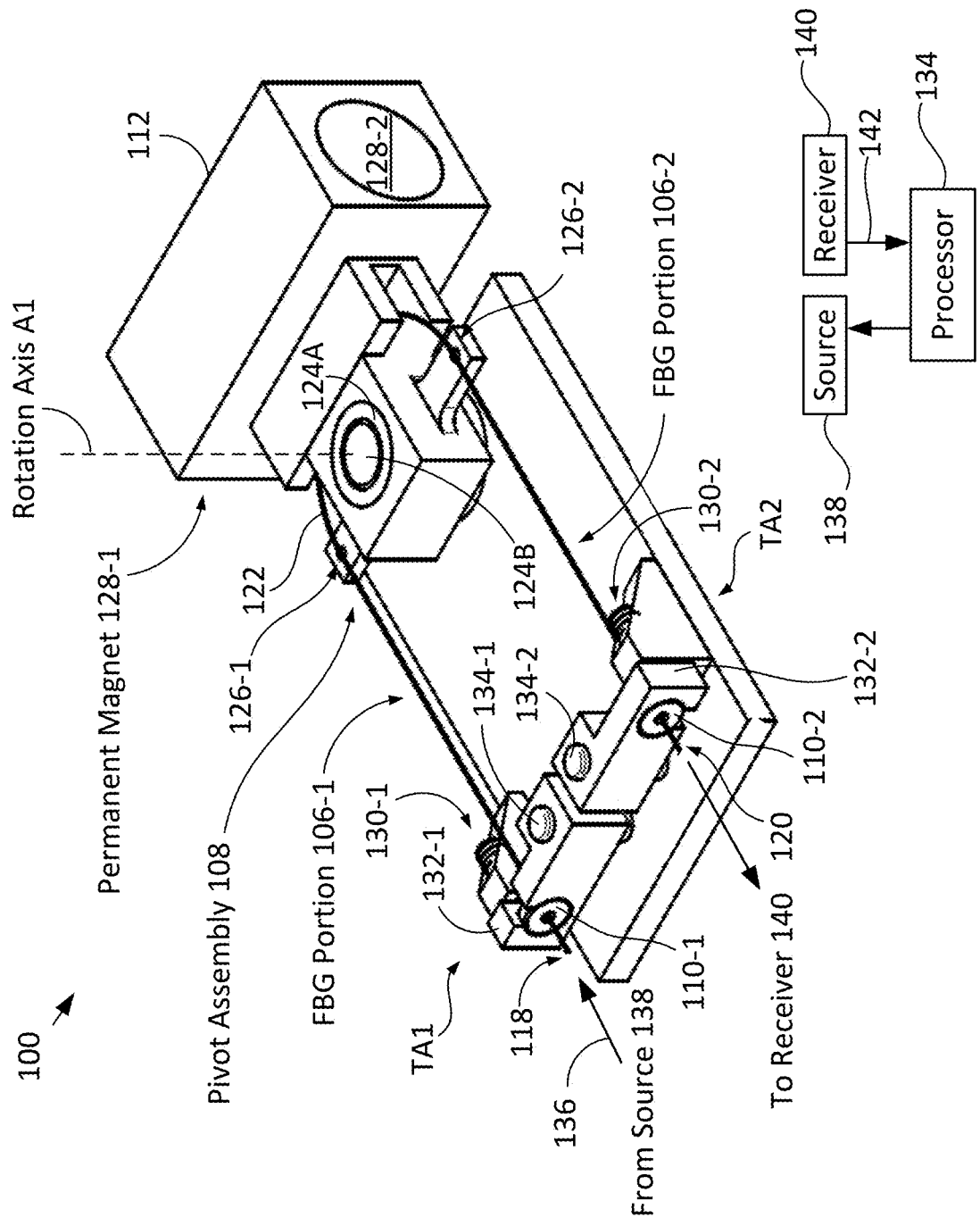

SECURITY SWITCH

STATEMENT OF RELATED CASES

This case is a continuation of co-pending U.S. patent application Ser. No. 16/107,749, filed on Aug. 21, 2018, which claims priority to U.S. Provisional Patent Application Ser. No. 62/548,035 filed on Aug. 21, 2017, each of which is incorporated herein by reference.

TECHNICAL FIELD

The present disclosure relates to switches in general, and, more particularly, to optical switches.

BACKGROUND

The area of security has received a great deal of attention in recent years due to the need to protect infrastructure and other high value assets. Part of this protection often includes alarming doors, windows, access panels, server doors, manhole covers, and other points of entry. There are many traditional switch designs that have been successfully employed to address many of these applications in the past; however, prior-art switches have several disadvantages, such as: sensitivity to electrical noise in their environment; susceptibility to corrosion, which limits where they can be located; an inability to operate over long distances, incompatibility with explosive environments, and difficulty in detecting tampering.

A security switch that mitigates some or all of these disadvantages would be a significant step forward in the state of the art.

SUMMARY

The present disclosure enables optical switching devices that overcome some or all of the disadvantages of the prior art. Switches in accordance with the present disclosure are designed for long-term security monitoring of high-value infrastructure entry points. Embodiments in accordance with the present disclosure are particularly well suited for use in remote locations, in electrically noisy environments, and/or in explosive environments, as well as in more conventional deployments.

An illustrative embodiment in accordance with the present disclosure is a switch that operates without the need for electrical power at the module and that optically communicates with a potentially highly remote base station. The illustrative switch includes an optical fiber that includes a pair of fiber-Bragg gratings (FBG). Each FBG is held between a fixed attachment point and a movable attachment point such that the fiber portion containing the FBG is under tension. The movable attachment points are mechanically coupled with a pivot assembly that can rotate about a rotation axis. The pivot assembly includes a bearing that is concentric with the rotation axis and a permanent magnet located in close proximity to an outer wall of a housing that encloses the entire assembly. When an external element comprising ferromagnetic material (e.g., metal, a permanent magnet, etc.) is in close proximity to the outer wall, the permanent magnet is drawn toward the wall, thereby giving rise to a rotation force on the pivot assembly such that the pivot assembly rotates slightly about the rotation axis. This rotation increases the tensile strain in one FBG while simultaneously reducing the tensile strain in the other FBG. As a result, the spacing of the FBG elements changes in substantially equal and opposite fashion. This gives rise to an equal and opposite change in the operating wavelengths of the FBGs. By monitoring the separation between these operating wavelengths, a change in the position of the external element relative to the outer can be detected.

In some embodiments, the pivot assembly includes two permanent magnets located on either side of the bearing such that the magnets are proximal to opposite outer walls. In such embodiments, the switch can be used to detect a change in the position of an external element relative to either outer wall.

In some embodiments, only one FBG is included and the position of the external element is detected by detecting a step function in the wavelength response of the FBG.

BRIEF DESCRIPTION OF THE DRAWINGS

FIGS. 1A-B depict perspective and top views, respectively, of a switch module in accordance with an illustrative embodiment in accordance with the present disclosure.

DETAILED DESCRIPTION

Figure 1A:
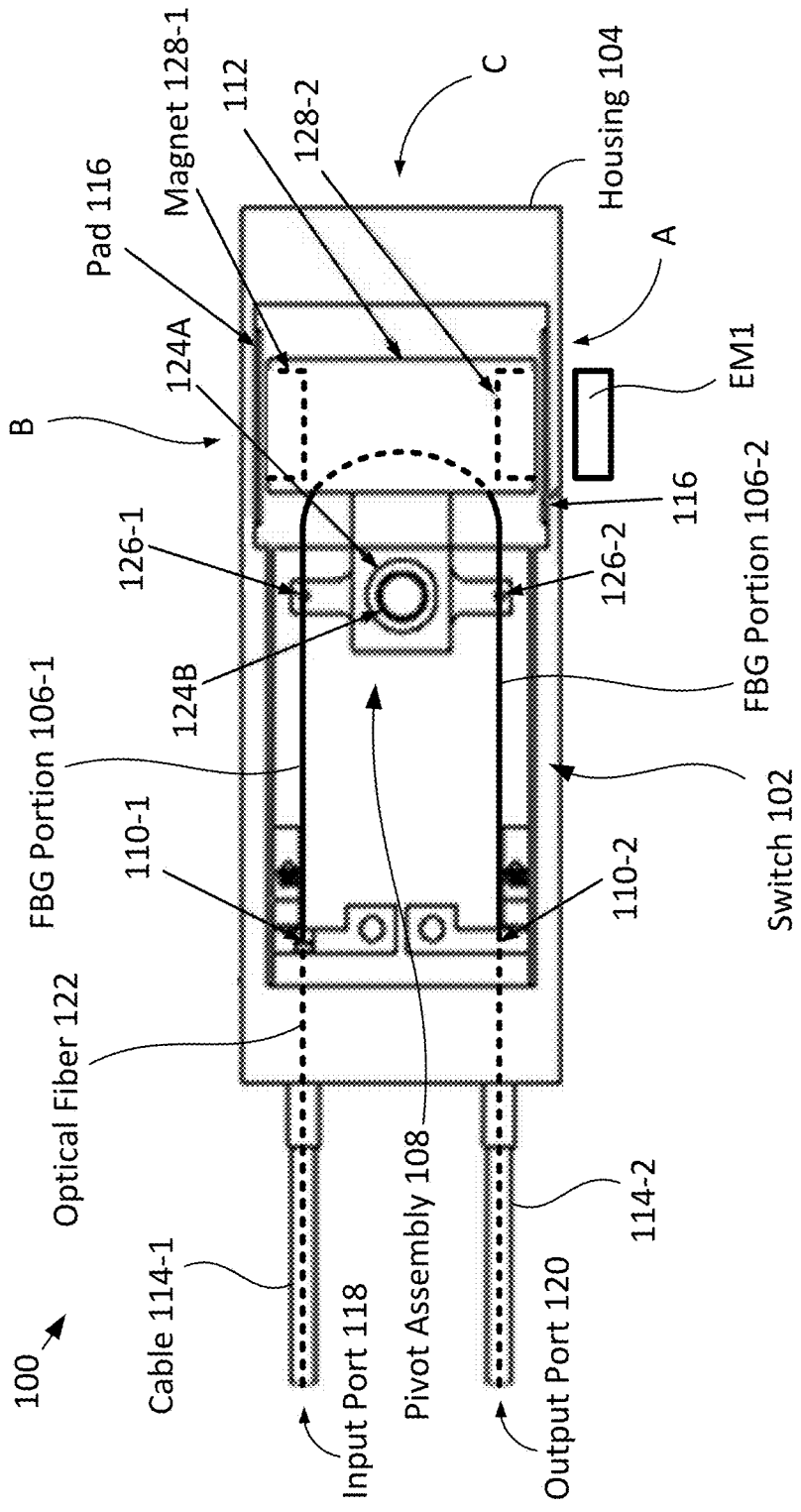

FIGS. 1A-B depict perspective and top views, respectively, of a switch module in accordance with an illustrative embodiment in accordance with the present disclosure. Switch module 100 comprises switch 102 and housing 104.

Switch 102 includes fiber-Bragg grating portions 106-1 and 106-2, pivot assembly 108, fiber-mounting disks 110-1 and 110-2, magnet holder 112, cables 114-1 and 114-2, pads 116, input port 118, output port 120, and external magnet EM1. In FIG. 1A, the switch module is depicted with the lid of housing 104 removed. In FIG. 1B, the switch module is depicted without housing 104 and external magnet EM1.

Housing 104 is an enclosure that surrounds switch 102 to protect it from environmental degradation. In the depicted example, housing 104 comprises aluminum; however, any suitable structural material can be used in housing 104, including, without limitation, polymers, ceramics, composite materials and the like.

Figure 2:
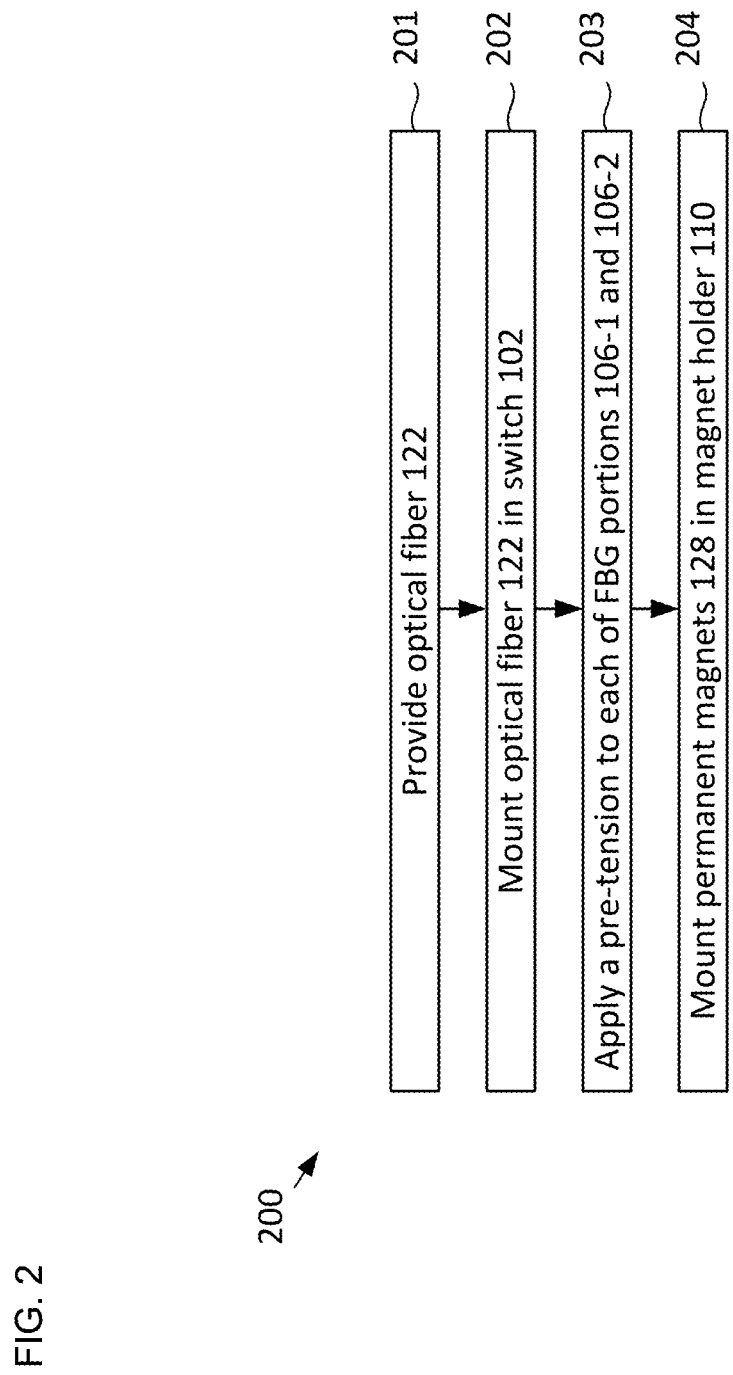
FIG. 2 depicts operations of a method for forming a security switch in accordance with the illustrative embodiment.

FIG. 2 depicts operations of a method for forming a security switch in accordance with the illustrative embodiment. Method 200 begins with operation 201, wherein optical fiber 122 is provided.

Optical fiber 122 is a conventional single-mode optical fiber that includes fiber-Bragg grating (FBG) portions 106-1 and 106-2, each of which includes an FBG. Optical fiber 106 guides light between input port 118 and output port 120.

Figure 3:
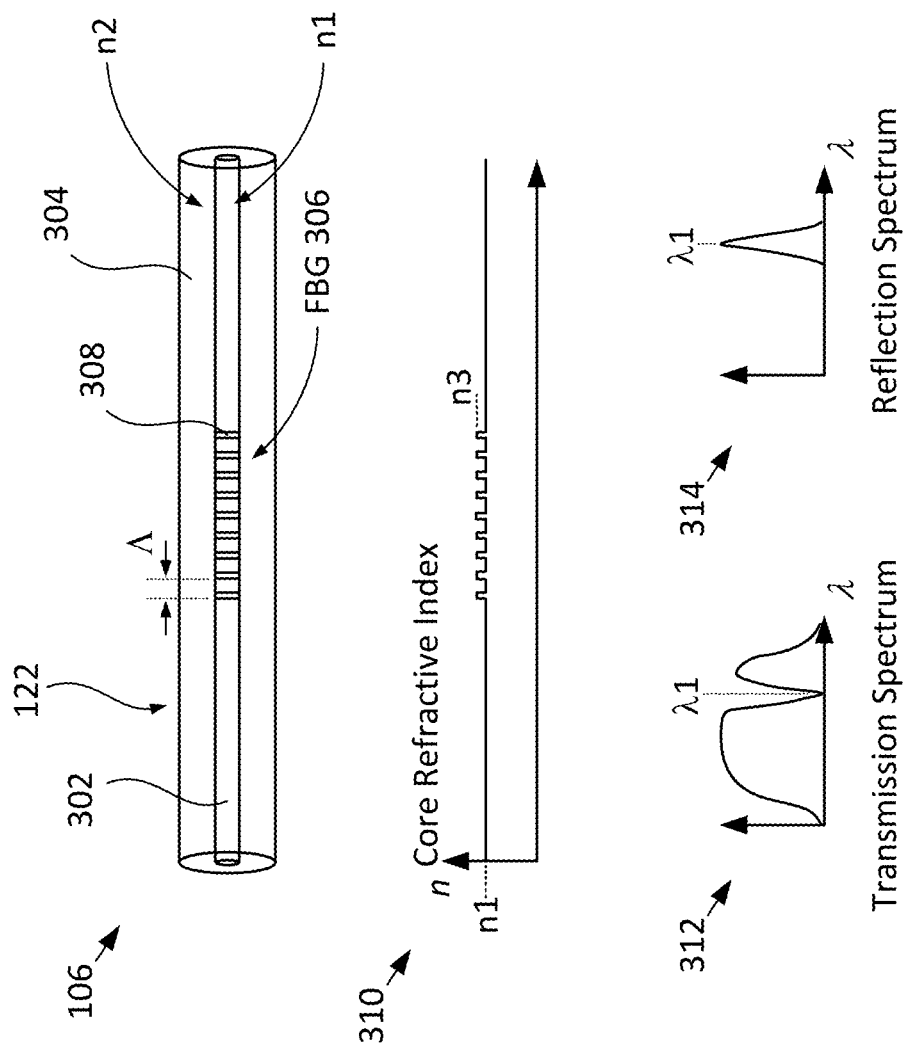
FIG. 3 depicts a cross-sectional view of a representative FBG portion.

FIG. 3 depicts a cross-sectional view of a representative FBG portion. FBG portion 106 includes core 302, cladding 304, and FBG 306 and is representative of each of FBG portions 106-1 and 106-2.

Core 302 comprises a light guiding material having a refractive index of n1.

Cladding 304 is material that surrounds core 302, where this material has a refractive index of n2, which is lower than n1. As a result, cladding 304 confines the optical energy of a light signal propagating through optical fiber 122 primarily to core 302.

FBG 306 is a periodic structure within optical fiber 106, which includes regions of features 308. Features 308 are written into the core of optical fiber 122 in conventional fashion such that each feature has a refractive index that is locally increased to n3, where n1<n3<n2. Features 308 are formed such that they are evenly spaced apart by unperturbed core material with Bragg-grating period Λ. FBG portion 106-1 includes FBG 306-1 having period Λ1 and FBG portion 106-2 includes FBG 306-2 having period Λ2.

Plot 310 depicts the variation of the refractive index of core 302 along the length of FBG portion 106.

Plots 312 and 314 show the transmission and reflection spectra, respectively, of FBG 306. As evinced by the plots, FBG 306 reflects light having operating wavelength λ1 while passing other wavelengths substantially unperturbed. The value of operating wavelength λ1 is based on the period, Λ, of FBG 306. As a result, a change in the length of FBG portion 106, will change grating period Λ, shifting operating wavelength λ1.

At operation 202, optical fiber 122 is mounted in switch 102. Optical fiber 122 is mounted is switch 102 such that FBG portions 106-1 and 106-2 (referred to, collectively, as FBG portions 106) are held between pivot assembly 108 and fiber-mounting disks 110-1 and 110-2, respectively.

Pivot assembly 108 is a mechanical fixture that includes bearing 124A, which rides on shaft 124B, thereby enabling the pivot assembly to rotate about rotation axis A1. In the depicted example, bearing 124A is a press-fit polymer bearing; however, other bearings (e.g., sleeve bearings, etc.) can be used without departing from the scope of the present disclosure. Pivot assembly 108 also includes attachment points 126-1 and 126-2, which rotate about rotation axis A1 with the pivot assembly.

In the depicted example, FBG 106-1 is located between fiber-mounting disk 110-1 and attachment point 126-1, and FBG 106-2 is located between fiber-mounting disk 110-2 and attachment point 126-2. In the depicted example, optical fiber 122 is rigidly attached to the fiber-mounting disks and attachment points using glass solder. In some embodiments, a different conventional method (e.g., crimping, epoxy, metals solder, etc.) is used to attach optical fiber 122 to at least one of the attachment points and fiber-mounting disks.

It should be noted that, preferably, optical fiber is arranged within switch 102 such that switch module 100 is polarization independent, thereby enabling interchangeability of input port 118 and output port 120.

At optional operation 203, tension is induced in FBG portions 106. Preferably, the tension induce in FBG portions 106 is substantially equal; however, unequal tensions can also be used. Applying a pre-tension in FBG portions 106 establishes a baseline strain that facilitates operation.

The tension in FBG portions 106-1 and 106-2 is controlled by tension assemblies TA1 and TA2, respectively, each of which includes an arm 132, a pin 134, and an adjustment screw 130.

Arms 132-1 and 132-2 are rigid members that are configured to rotate about pins 134-1 and 134-2, respectively. Arm 132-1 includes a fiber mounting disk 110-1, which rigidly clamps an end of FBG portion 106-1. When adjustment screw 130-1 is tightened, it pushes fiber-mounting disk 110-1 away from pivot assembly 108, thereby increasing the tension in FBG portion 106-1. In similar fashion, arm 132-2 includes a fiber mounting disk 110-2, which rigidly clamps one end of FBG portion 106-2. When adjustment screw 130-2 is tightened, the adjustment screw pushes fiber-mounting disk 110-2 away from pivot assembly 108 and the tension in FBG portion 106-2 is increased.

At operation 204, permanent magnets 128-1 and 128-2 are mounted in magnet holder 112.

Magnet holder 112 is a rigid fixture that is attached to pivot assembly 108 such that motion of magnet conventional permanent magnets 128-1 and 128-2 rotates pivot assembly 108 about rotation axis A1. In the depicted example, permanent magnets 128-1 and 128-2 are press-fit into opposite sides of magnet holder 112; however, any suitable method can be used to attach the permanent magnets to the magnetic holder without departing from the scope of the present disclosure.

Cables 114-1 and 114-2 are tactical or armored cables that are optionally included in switch module 100 to protect optical fiber 122.

Pads 116 are optionally included in switch module 100 to limit the total range of motion of pivot assembly 108, as well as dampen the motion of the pivot assembly when switch 102 is tripped.

Figure 4:
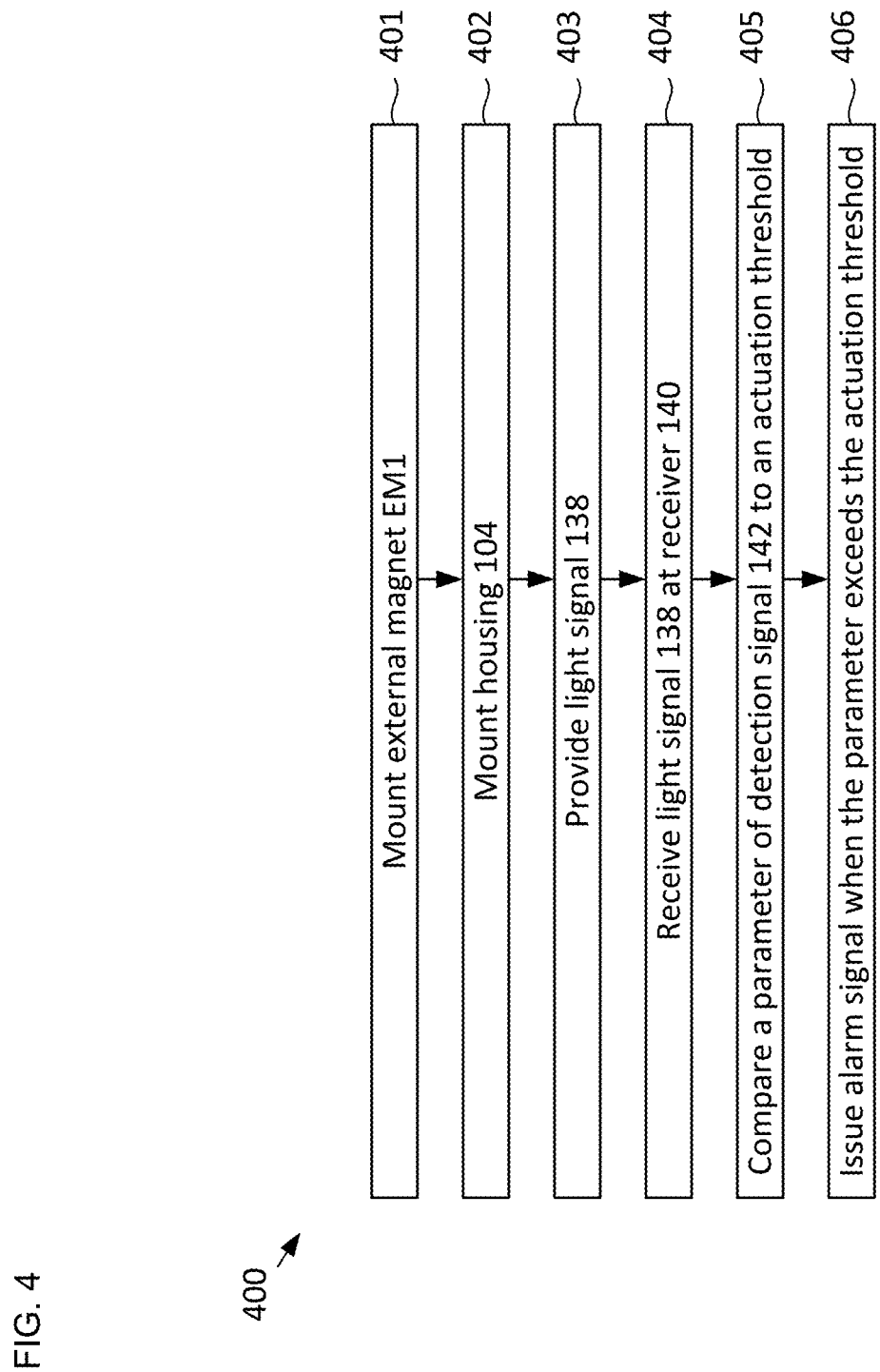
FIG. 4 depicts operations of a method for monitoring an access point in accordance with the illustrative embodiment.

FIG. 4 depicts operations of a method for monitoring an access point in accordance with the illustrative embodiment. In the depicted example, the access point is a doorway comprising a moving door and a stationary doorframe; however other access points (e.g., windows, skylights, etc.) can be monitored without departing from the scope of the present disclosure. Furthermore, in some embodiments, switch module 100 is used to monitor configurations other than access points, such as the position of valuable items, such as equipment, computers, vehicles, etc. Operation 400 begins with operation 401, wherein external magnet EM1 is mounted to a stationary member of the access point. In the depicted example, the access point is a doorway and the stationary member is a portion of its doorframe.

At operation 402, housing 104 is mounted to the door of the doorway such that surface A is in close proximity with external magnet EM1 and permanent magnet 128-2 and external magnet EM1 are operatively (i.e., magnetically) coupled. It should be noted that, in some embodiments, external magnet EM1 is not included and switch module 100 is mounted such that surface A is in close proximity to a different element, such as a ferromagnetic metal element, etc., that is magnetically coupled with permanent magnet 128-2. Furthermore, in some embodiments, housing 104 is mounted to a stationary member and the element with which it is magnetically coupled is mounted on a moving element of the access point.

When permanent magnet 128-2 and external magnet EM1 are magnetically coupled, an attractive force between them arises causing permanent magnet 128-2 to move toward surface A. The motion of the magnet rotates pivot assembly 108 clockwise about rotation axis A1, thereby increasing the strain in FBG portion 106-1 while simultaneously reducing the strain in FBG portion 106-2.

As a result, grating period Λ1 of FBG 306-1 increases and grating period Λ2 of FBG 306-2 decreases, thereby changing the spectral positions of operating wavelengths λ1-1 and λ1-2. These operating wavelengths remain constant until switch 102 is actuated. In the depicted example, switch 102 is armed by pre-tensioning FBG portions 106-1 and 106-2 to establish an initial separation of 1 nm between the FBG operating wavelengths when permanent magnet 128-2 and external magnet EM1 are magnetically coupled.

At operation 403, source 138 provides light signal 136 to input port 118.

Source 138 is a conventional light source operative for providing light signal 136 such that its spectrum includes operating wavelengths λ1-1 and λ1-2.

At operation 404, receiver 140 receives light signal 138 from output port 120.

Receiver 140 is a conventional optical detection system operative for detecting light whose spectral content includes operating wavelengths λ1-1 and λ1-2. Receiver 140 provides detection signal 142 to processor 134, where the detection signal includes the spectral positions of operating wavelengths λ1-1 and λ1-2. In some embodiments, detection signal 142 includes the magnitude of light at one or both of operating wavelengths λ1-1 and λ1-2.

Processor 134 is a conventional processor that is operative for, among other things, processing detection signal 142 and issuing an alert when actuation of switch 102 is detected.

At operation 405, processor 134 compares a parameter of detection signal 142 to an actuation threshold. In the depicted example, the parameter monitored is the separation between operating wavelengths λ1-1 and λ1-2 and the actuation threshold is a difference of 2 nm between operating wavelengths λ1-1 and λ1-2. In some embodiments, the actuation threshold is a predetermined magnitude change in the intensity of light at one or both of operating wavelengths λ1-1 and λ1-2.

Switch 102 actuates when the separation between permanent magnet 128-2 and external magnet EM1 changes as a result of movement of the door on which housing 104 is mounted. This change in separation reduces the magnetic force between permanent magnet 128-2 and external magnet EM1 and pivot assembly 108 rotates counter-clockwise. As a result, grating period Λ1 of FBG 306-1 decreases while grating period Λ2 of FBG 306-2 realizing equal and opposite wavelength shifts of operating wavelengths λ1-1 and λ1-2.

At operation 406, if the monitored parameter exceeds the actuation threshold, processor 134 issues an alarm signal that indicates switch 102 has been actuated.

It should be noted that, because pivot assembly 108 includes a magnet on both sides, both of sides A and B can be monitored with switch module 100. In some embodiments, pivot assembly 108 includes only one magnet and, therefore, only one of sides A and B can be monitored. In some embodiments, pivot assembly 108 is configured in a different shape (e.g., an L shape) such that a permanent magnet 128 is adjacent to and points toward surface C of housing 104.

In some embodiments, adjustment screws 124, arms 126, and pins 128 are not included and, therefore, FBG portions 122-1 and 122-2 are not preset to a desired tension level. In such embodiments, the FBGs will have whatever operating wavelengths arise due stress induced during packaging. By measuring each operating wavelength at installation, however, a baseline difference is established. Actuation in such embodiments is detected when the operating-wavelength difference changes more than the actuation threshold, as described above.

It should be noted that the use of two FBGs as described above and with respect to switch module 100 is preferable because it provides a measure of tolerance to temperature variation for the switch module because a temperature change affects the operating wavelength of each FBG substantially equally. As a result, the operating-wavelength difference remains substantially constant regardless of changes in ambient temperature.

Figure 5:
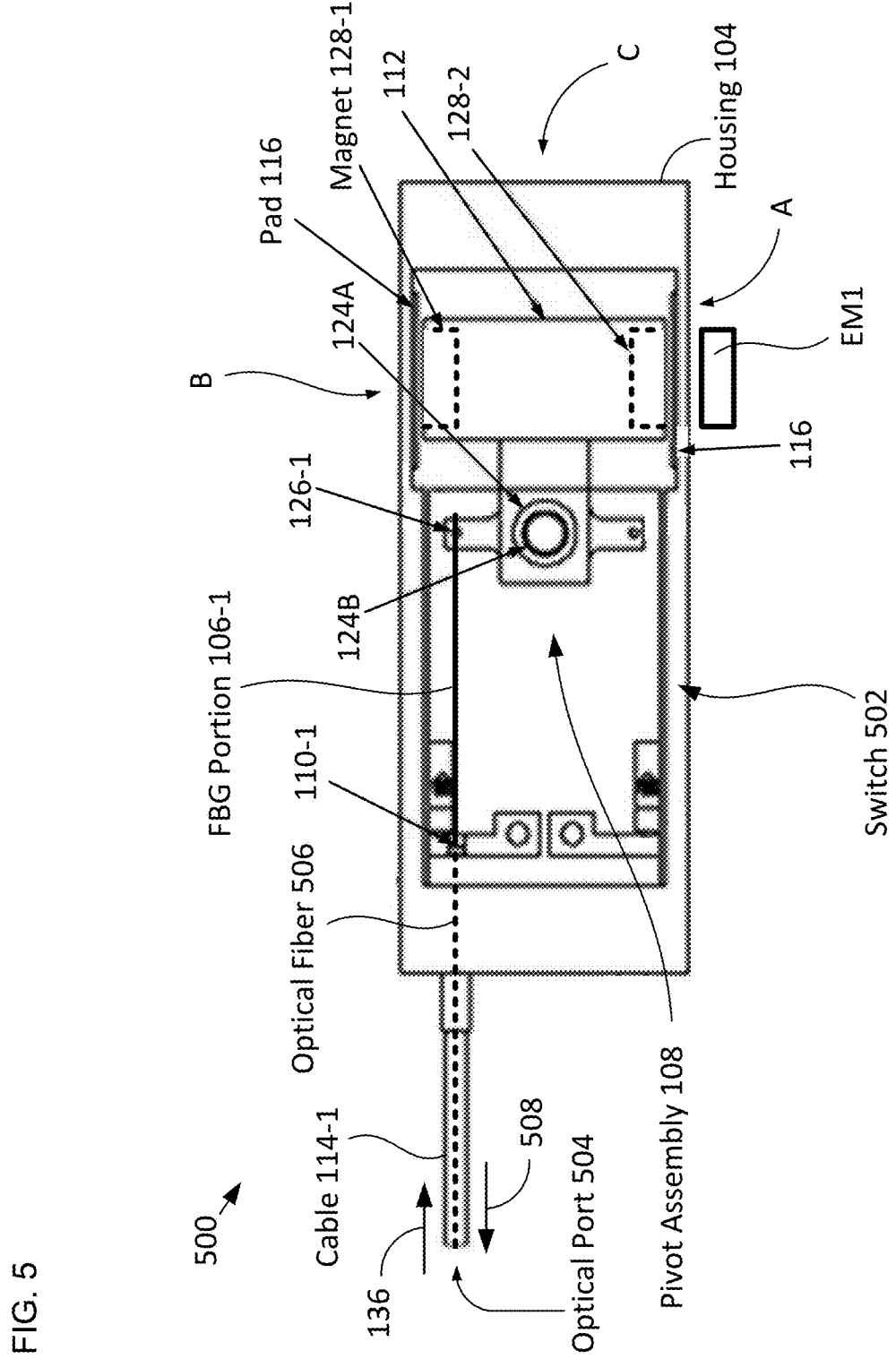
FIG. 5 depicts a schematic drawing of a top view of a switch module in accordance with an alternative embodiment in accordance with the present disclosure.

FIG. 5 depicts a schematic drawing of a top view of a switch module in accordance with an alternative embodiment in accordance with the present disclosure. Switch module 500 comprises switch 502 and housing 104.

Switch 502 is analogous to switch 102; however, switch 502 includes only one fiber-Bragg grating portion—FBG portion 106-1. In addition, switch 502 includes optical port 504, which functions as both input and output port for the switch.

Optical fiber 506 is analogous to a portion of optical fiber 122 as described above.

Light signal 136 is injected into optical fiber 506 at optical port 504.

Reflection signal 508 is received from FBG portion 106-1 at optical port 504.

Actuation of switch 502 is detected by detecting a step function in the operating wavelength of FBG 306-1 contained in reflection signal 508. Unfortunately, ambient-temperature changes can cause a slow drift in the FBG operating wavelength. As a result, switch 502 substantially constant monitoring to determine its state. In some embodiments, actuation of switch 502 is detected by detecting a change in the magnitude of light at a wavelength, such as the operating wavelength, in reflection signal 508.

It should be noted that switch modules in accordance with the present disclosure have significant advantages over prior-art security switches, including the ability to:
  i. operate in "electrical noisy" environments without interference or signal degradation because they rely on only optical signals; or
  ii. operate over long distance—up to many kilometers from a base station used to interrogation them; or
  iii. be "daisy changed" with other switches, switch modules, and/or optical sensors, thereby reducing the cost of system installation; or
  iv. operate in potentially explosive atmospheres because they operate with low-power optical signals
  v. any combination of i, ii, iii, and iv.

Furthermore, in some embodiments, switch modules in accordance with the present disclosure are substantially corrosion resistant, non-contact, and totally enclosed. As a result, the reliability of such switch modules is improved—particularly for long-term sensing applications in extreme environments, due to the absence of any through-the-wall shafts, levers, or cams that could otherwise give rise to a jam of the switch.

Still further, switch modules in accordance with the present disclosure are very difficult to defeat. If the optical fiber is cut, the signal is lost. In the case of a switch module having two FBGs, no prior knowledge of the state of the switch module is required after a power outage to determine the state of the switch module when the power is restored.

One skilled in the art will recognize, after reading this Specification, that each FBG in a daisy-chain configuration preferably operates at a different wavelength. In some embodiments, the operating wavelength of each FBG is known at installation, which enables each switch module a unique identifier that facilitates locating the precise location of where access to a facility has occurred.

It is to be understood that the disclosure teaches just some examples of embodiments and that many variations can easily be devised by those skilled in the art after reading this disclosure without departing from its scope and that the scope of the present invention is to be determined by the following claims.

What is claimed is:

1. A switch module comprising:
  a first fiber-Bragg grating (FBG) portion that includes a first FBG characterized by a first operating wavelength, wherein the first FBG portion has a first length, and wherein the first operating wavelength is based on the first length; and a first magnet that is mechanically coupled with the first FBG portion such that a first motion of the first magnet induces a first change in the first length that gives rise to a second change in the first operating wavelength.

2. The switch module of claim 1 further comprising:
a housing that contains the first FBG portion and the first magnet; and
a ferromagnetic element that is external to the housing;
wherein the ferromagnetic element and the first magnet are configured such that (1) the magnetic coupling between them is based on a first separation between the housing and the ferromagnetic element and (2) a change in the first separation induces the first motion.

3. The switch module of claim 2 further comprising:
a second FBG portion that includes a second FBG characterized by a second operating wavelength, wherein the second FBG portion has a second length, and wherein the second operating wavelength is based on the second length;
a pivot assembly that includes a first attachment point and a second attachment point, wherein the pivot assembly is mechanically coupled with the first magnet such that the first motion induces a first rotation of the first and second attachment points about a rotation axis;
a third attachment point; and
a fourth attachment point;
wherein the first FBG portion is affixed to each of the first attachment point and the third attachment point, and wherein a first separation between the first and the third attachment points defines the first length;
wherein the second FBG portion is affixed to each of the second attachment point and the fourth attachment point, and wherein a second separation between the second and the fourth attachment points defines the second length; and
wherein the first rotation increases the first length and decreases the second length.

4. The switch module of claim 3 wherein the first rotation increases the first length and decreases the second length by the same magnitude.

5. The switch module of claim 3 further comprising:
a first tension assembly that is configured to control the tension in the first FBG portion; and
a second tension assembly that is configured to control the tension in the second FBG portion.

6. The switch module of claim 1 further comprising:
a pivot assembly that includes a first attachment point, wherein the pivot assembly is mechanically coupled with the first magnet such that the first motion induces a first rotation of the first attachment point about a rotation axis; and
a second attachment point;
wherein the first FBG portion is affixed to each of the first attachment point and the second attachment point, and wherein a first separation between the first and the second attachment points defines the first length.

7. The switch module of claim 6 further comprising a tension assembly that is configured to control the tension in the first FBG portion.

8. The switch module of claim 1 further comprising:
a source for providing a first light signal to the first FBG grating, the first light signal having a spectral range that includes the first operating wavelength;

a receiver for detecting a second light signal received from the first FBG grating, the second light signal being characterized by the first operating wavelength, wherein the second light signal includes at least a portion of the first light signal; and
a processor for monitoring a parameter of the second light signal, wherein the parameter is selected from the group consisting of spectral position and magnitude.

9. A switch module comprising:
(1) a housing; and
(2) a switch that is contained within the housing, wherein the switch includes:
  (i) a first fiber-Bragg grating (FBG) portion that includes a first FBG characterized by a first operating wavelength, wherein the first FBG portion has a first length that extends between a first attachment point and a second attachment point, and wherein the first operating wavelength is based on the first length;
  (ii) a pivot assembly that includes the first attachment point; and
  (iii) a first magnet that is mechanically coupled with the pivot assembly such that a first motion of the first magnet rotates the first attachment point about a rotation axis and induces a first change in the first length that gives rise to a second change in the first operating wavelength.

10. The switch module of claim 9 further comprising (3) a tension assembly that is configured to control the tension in the first FBG portion.

11. The switch module of claim 9 further comprising:
(3) a source for providing a first light signal to the first FBG grating, the first light signal having a spectral range that includes the first operating wavelength;
(4) a receiver for detecting a second light signal received from the first FBG grating, the second light signal being characterized by the first operating wavelength, wherein the second light signal includes at least a portion of the first light signal; and
(5) a processor for monitoring a parameter of the second light signal, wherein the parameter is selected from the group consisting of spectral position and magnitude.

12. The switch module of claim 9 wherein the switch further comprises:
(iv) a second FBG portion that includes a second FBG characterized by a second operating wavelength, wherein the second FBG portion has a second length that extends between a third attachment point and a fourth attachment point, and wherein the second operating wavelength is based on the second length;
wherein the pivot assembly includes the third attachment point; and
wherein the first motion rotates the third attachment point about the rotation axis and induces a third change in the second length that gives rise to a fourth change in the second operating wavelength.

13. The switch module of claim 12 wherein the first change and third change are equal and opposite.

14. A method comprising:
(1) providing a switch by operations that include:
  (i) attaching a first fiber-Bragg grating (FBG) portion that includes a first FBG characterized by a first operating wavelength to a first attachment point and a second attachment point, wherein the first FBG portion is mounted such that it has a first length defined by the separation between the first and second attachment points, and wherein the first operating wavelength is based on the first length; and (ii) providing a first magnet that is mechanically coupled with the first attachment point such that a first motion of the first magnet induces a first change in the first length that gives rise to a second change in the first operating wavelength.

15. The method of claim 14 further comprising (2) inducing a first pre-tension in the first FPG portion by moving the second attachment point to change the first length.

16. The method of claim 14 further comprising:
(2) locating the switch on a first element such that the first motion is induced by a second motion of one of the first element and a second element relative to the other one of the first and second elements;
(3) conveying a first light signal through the first FBG portion, wherein the first light signal includes the first operating wavelength; and
(4) monitoring a first parameter of a second light signal characterized by the first operating wavelength, wherein the second light signal includes at least a portion of the first light signal.

17. The method of claim 16 wherein the first parameter is the spectral position of the first operating wavelength.

18. The method of claim 16 wherein the first parameter is the magnitude of the second light signal.

19. The method of claim 14 further comprising (2) inducing a second change in the first length by moving the second attachment point.

20. The method of claim 14 wherein the switch is provided by operations that further include (iii) providing a pivot assembly that includes the first attachment point, wherein the first magnet is mechanically coupled with the first attachment point via the pivot assembly such that the first motion induces a rotation of the first attachment point about a first rotation axis.

\* \* \* \* \*